(12) United States Patent
Janakiraman

(10) Patent No.: US 9,191,872 B2
(45) Date of Patent: Nov. 17, 2015

(54) SYSTEM AND METHOD TO CORRELATE HANDOVER TRANSITIONS BETWEEN 3GPP NETWORK ACCESS AND UNTRUSTED NON-3GPP NETWORK ACCESS

(71) Applicant: Tektronix, Inc., Beaverton, OR (US)

(72) Inventor: Vignesh Janakiraman, Plano, TX (US)

(73) Assignee: Tektronix, Inc., Beaverton, OR (US)

( * ) Notice: Subject to any disclaimer, the term of this patent is extended or adjusted under 35 U.S.C. 154(b) by 156 days.

(21) Appl. No.: 14/133,254

(22) Filed: Dec. 18, 2013

(65) Prior Publication Data

US 2015/0172981 A1    Jun. 18, 2015

(51) Int. Cl.
*H04W 4/00* (2009.01)
*H04W 36/14* (2009.01)
*H04W 48/18* (2009.01)
*H04W 92/02* (2009.01)

(52) U.S. Cl.
CPC .............. *H04W 36/14* (2013.01); *H04W 48/18* (2013.01); *H04W 92/02* (2013.01)

(58) Field of Classification Search
None
See application file for complete search history.

(56) References Cited

U.S. PATENT DOCUMENTS

| | | | | |
|---|---|---|---|---|
| 2008/0305799 | A1* | 12/2008 | Zuniga et al. | 455/437 |
| 2008/0316972 | A1* | 12/2008 | Shaheen | 370/331 |
| 2010/0040024 | A1* | 2/2010 | Wu | 370/331 |
| 2010/0150046 | A1* | 6/2010 | Li et al. | 370/311 |
| 2010/0323700 | A1* | 12/2010 | Bachmann et al. | 455/436 |
| 2011/0138447 | A1* | 6/2011 | Xu | 726/4 |

* cited by examiner

*Primary Examiner* — Chi H Pham
*Assistant Examiner* — Soon-Dong D Hyun
(74) *Attorney, Agent, or Firm* — Locke Lord LLP; Scott D. Wofsy; Christopher J. Capelli

(57) ABSTRACT

There is provided a passive network monitoring device that monitors one or more network interfaces between network nodes including a SGW node, a PGW node, an ePDG node, and a PCRF node and a PCEF node. The device receives a handover indication for UE from untrusted non-3GPP network access to 3GPP network access and receives a response to an attach request from one or more of the network interfaces, the response including a MSIP address and a charging ID for the UE. The device determines the UE is from a single subscriber based on each of the handover, the MSIP address of the response and the charging ID of the response, and correlates information for the UE at each of the one or more network interfaces with the single subscriber.

18 Claims, 7 Drawing Sheets

SYSTEM AND METHOD TO CORRELATE HANDOVER TRANSITIONS BETWEEN 3GPP NETWORK ACCESS AND UNTRUSTED NON-3GPP NETWORK ACCESS

BACKGROUND

1. Field of the Invention

The present disclosure relates to tracking User Equipment (UE) amongst various types of network access, and more particularly, to correlating UE to a particular subscriber during handover transitions.

2. Description of the Related Art

The 3rd Generation Partnership Project (3GPP) organization specifies the architecture of mobile cellular networks like Global System for Mobile Communications (GSM) and Universal Mobile Telecommunications System (UMTS). The latest mobile network architecture defined by the 3GPP is called Evolved 3GPP Packet Switched Domain—also known as the Evolved Packet System (EPS).

The EPS combines an Evolved Packet Core (EPC) network that is able to connect a new generation of an access network technology called Evolved Universal Terrestrial Radio Access Network (E-UTRAN) as well as the pre-successor of the E-UTRAN called Universal Terrestrial Radio Access Network (UTRAN). The 3GPP EPS is also able to provide connectivity to mobile terminals (also known as User Equipment(s) (UEs)) attached non-3GPP access networks.

3GPP networks also provide for inter-connection between the EPC and non-3GPP access networks. While the 3GPP access networks are based on access technologies standardized by the 3GPP organization, non-3GPP access networks are based on access technologies defined by other organizations like Institute of Electrical and Electronics Engineers (IEEE) and 3rd Generation Partnership Project 2 (3GPP2). For example two technologies defined by the IEEE that may interwork with the EPC are WLAN (Wireless Local Area Network), i.e. the IEEE standard 802.11 family, and WiMAX (Worldwide Interoperability for Microwave Access), also known as the IEEE standard 802.16 family.

Conventional mobile electronic devices such as mobile phones, tablets, computers, etc., are often equipped to communicate on both 3GPP communication networks as well as non-3GPP access networks (e.g., WLAN, etc.). In fact, mobile data offloading refers to the use of complementary network technologies for delivering data originally targeted for 3GPP communication networks. Rules triggering the mobile offloading action can be set by either an end-user (mobile subscriber) or an operator. The code operating on the rules resides in an end-user device, in a server, or is divided between the two. End users use data offloading for data service cost control, the availability of higher bandwidth and the like. Operators use data offloading to ease congestion of cellular networks. However, when subscriber UE transfers to/from 3GPP access from/to non-3GPP access (e.g., untrusted 3GPP access) subscriber information is typically lost. That is, tracking subscribers during UE transfers between networks is difficult at best, which affects accuracy when monitoring key performance indicators, Quality of Service (QoS), and other operating metrics for subscribers.

SUMMARY

This disclosure provides systems and methods that correlate handovers for subscribers between 3GPP networks and untrusted non-3GPP networks. In particular, the invention provides seamless tracking for subscribers' User Equipment (UE) across the various networks and correlates network connections established prior to a handover as well as post-handover. Such correlation enables subscriber related Key Performance Indicators (KPIs) to be accurately and consistently tracked.

In particular, according to one embodiment of the disclosure, a passive network monitoring device correlates a subscriber to UE during a handover transition from 3GPP network access to untrusted non-3GPP network access. According to this embodiment, the passive network monitoring device monitors one or more network interfaces between network nodes including a serving gateway (SGW) node, a packet data network gateway (PGW) node, an evolved Packet Data Gateway (ePDG) node, and a Policy Control and Charging Rules Function (PCRF) node and a Policy and Charging Enforcement Function (PCEF) node. The device receives a handover indication for the UE from untrusted non-3GPP network access to 3GPP network access (e.g., from a create session request from the network interfaces between the SGW node and the PGW node, which indicates the handover for the UE, etc.), and receives a response to an attach request from one or more of the network interfaces (e.g., a create session response, etc.). The response includes a mobile service internet protocol (MSIP) address (e.g., in a PDN Address Allocation field) and a charging identification (ID) for the UE. The device determines the UE is from a single subscriber based on each of the handover, the MSIP of the response and the charging ID of the response, and correlates information for the UE at each of the one or more network interfaces with the single subscriber.

In another embodiment, the passive network monitoring device also determines data bearer contact information for the UE prior to receiving the attach request, determines data bearer context information for the UE after receiving the response, and maps the data bearer context information prior to receiving the attach request to the data bearer context information after receiving the response when the UE is from the single subscriber.

In other embodiments, the passive network monitoring device correlates a subscriber to UE during a handover transition from untrusted non-3GPP network access to 3GPP network access. In these embodiments, the passive network monitoring device monitors one or more network interfaces between network nodes including a serving gateway (SGW) node, a packet data network gateway (PGW) node, an evolved Packet Data Gateway (ePDG) node, and a Policy Control and Charging Rules Function (PCRF) node and a Policy and Charging Enforcement Function (PCEF) node. The passive network monitoring device further receives a handover indication for UE from 3GPP network access to untrusted non-3GPP network access and also receives a response to an attach request from one or more of the network interfaces. Notably, the response includes a mobile service internet protocol (MSIP) address and a charging identification (ID) for the UE. The passive network monitoring device also determines that the UE is from a single subscriber based on each of: the handover indication, the MSIP of the response and the charging ID of the response, and correlates information for the UE at each of the one or more network interfaces with the single subscriber.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DESCRIPTION OF EXAMPLE EMBODIMENTS

As discussed above, the 3rd Generation Partnership Project (3GPP) organization specifies the architecture of mobile cellular networks like Global System for Mobile Communications (GSM) and Universal Mobile Telecommunications System (UMTS). The latest mobile network architecture defined by the 3GPP is called Evolved 3GPP Packet Switched Domain—also known as the Evolved Packet System (EPS).

3GPP also defines a mobile network as a Public Land Mobile Network (PLMN) that is established and operated by an operator for providing mobile telecommunications services. A UE subscribed to 3GPP services has a Home PLMN (HPLMN) that maintains the subscription data and allowed services and QoS levels. When UE is attached to a network different from the HPLMN, the UE is indicated as a roaming node and the visited network is denoted as visited PLMN (VPLMN)—notably, the UE is also sometimes referred to as a Mobile Node (MN).

The 3GPP specifies two data packet gateways located in the EPC supporting the UE's mobility—Serving Gateway (SGW) and Packet Data Network Gateway (PGW). The SGW terminates the interface towards the radio access networks, e.g. the UTRAN or the E-UTRAN. The PGW performs UE IP address allocation and packet filtering (e.g. deep packet inspection, packet screening) in order to map the UE's traffic to appropriate Quality of Service (QoS) level. The PGW performs the function of a home agent (HA), in case of MIPv6 (Mobile IPv6) based mobility management, or the function of a Local Mobility Anchor (LMA), in case Proxy MIPv6 protocols are used for mobility management.

EPS Architecture

Figure 1:
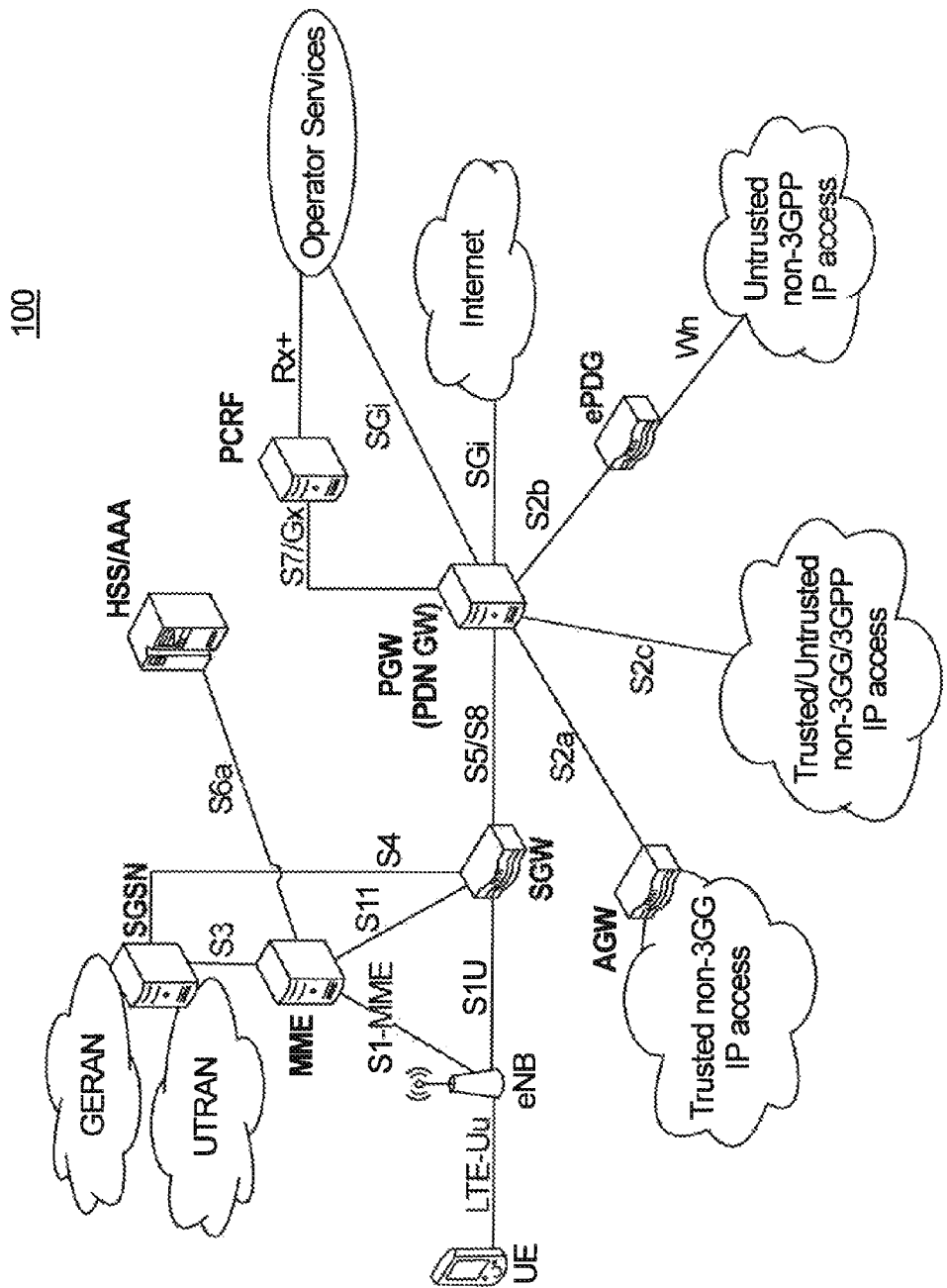
FIG. 1 shows an overview on the architecture of a 3GPP Evolved Packet System (EPS)

FIG. 1 shows an EPS architecture where the PGW is connected to the 3GPP access networks (independent of the access technology type, i.e. UTRAN, E-UTRAN) via the so-called S5 interface, i.e. to the SGW, and further to the non-3GPP access network via the so-called S2a interface, i.e. to the Access Gateway (AGW) or via the so-called S2b interface, i.e. to the evolved Packet Data Gateway (ePDG). Further, the UE may also to connect to the PGW when attached to the non-3GPP access network using the so-called S2c interface when employing Dual Stack MIPv6 (DSMIPv6).

When the UE is attached to the 3GPP access network, the UE is connected to the eNode B (NB) or to the evolved Node B (eNode B) that terminates the air interface. The eNode B is connected to the SGW via the S1-U interface (i.e. the user interface for user plane data). The S5 interface between the SGW and the PGW can be based either on the GPRS Tunneling Protocol (GTP) or the Proxy MIPv6 (PMIPv6) protocol. The S1-U interface is based on the GTP protocol according to the current 3GPP specifications. In the non-3GPP access, the S2a, respectively S2b interface between the AGW, respectively ePDG and the PGW is based on the PMIPv6 protocol.

PDN Connection

The mobile network, i.e. the EPS, provides IP connectivity between the UE and an external packet data network (PDN). In the 3GPP terminology, this is referred to as PDN Connectivity Service and the data flow between the UE and the PGW is usually referred to as a PDN connection. For each PDN connection the UE has a different IP configuration, i.e. a different IPv4 address and/or an IPv6 prefix. A PDN connection between the UE and the PGW is represented by an Access Point Name (APN). When the UE requests connectivity during the attach procedure to 3GPP access network, the UE usually indicates the APN to the Mobility Management Entity (MME) in the 3GPP access network or to the AGW/ePDG in the non-3GPP access network (see FIG. 1).

When PMIP is used for mobility management, the MME (or correspondingly the AGW/ePDG) chooses a proper PGW of the EPS, which can provide connectivity to the desired APN. In case of using DSMIPv6 between the UE, and when the PGW is used for mobility management, the UE itself can choose the PGW.

EPS Bearers

The PDN connectivity service is provided by a so-called EPS bearer. A UE may run multiple applications, such as VoID call and FTP download simultaneously. Each application could have different QoS requirements, i.e. different QoS parameters like packet delay and/or packet delay jitter, packet loss rate, guaranteed bit rate, etc. The 3GPP defines that different EPS bearers meet the different QoS requirements of each different application. An EPS bearer uniquely identifies traffic flows that receive a common QoS treatment between a UE and a PGW. There could be multiple applications with different QoS requirements to the same PDN, i.e. to the same PDN connection, or just one application per PDN connection. So to say, a PDN connection is provided by one or more EPS bearers to the UE.

Typically, when the UE connects to a PDN, one EPS bearer is established and remains established throughout the lifetime of the PDN connection to provide the UE with always-on IP connectivity to that PDN. This one bearer is referred to as the "default bearer". A default EPS bearer context is activated, when the UE requests a PDN connection, i.e. a new default EPS bearer is set up for every new PDN connection.

Any additional EPS bearer that is established for the same PDN connection is referred to as a dedicated bearer. A dedicated EPS bearer context is always linked to a default EPS bearer context and represents additional EPS bearer resources between the UE and the PDN. The decision to establish or modify a dedicated bearer can only be taken by the EPC, and the bearer level QoS parameter values are always assigned by the EPC. Therefore, the MME shall not modify the bearer level QoS parameter values received on the S11 reference point during establishment or modification of a dedicated bearer.

In the 3GPP architecture, establishment of dedicated bearer is triggered by the Policy Control and Charging Rules Function (PCRF) either to the PGW (in case of using GTP on the S5 interface) or to SGW (in case of using PMIP on the S5 interface). The SGW informs the MME via the S11 interface about the setup of a dedicated bearer with the corresponding QoS parameters and QoS Class Identifier (QCI) level. The MME triggers the eNode B to establish the corresponding 51 bearer (between eNode B and the SGW) and radio bearer (between eNode B and UE on the air interface).

In the current 3GPP EPS specification the UE can have maximum 8 user plane EPS bearers simultaneously, independent of the number of PDN connections. Several applications (or data flows) can be mapped onto one EPS bearer. Each bearer has an associated QCI. Each QCI is characterized by priority, packet delay budget and acceptable packet loss rate. The data traffic mapped to the same EPS bearer receive the same packet forwarding treatment (e.g. scheduling policy, queue management policy, rate shaping policy, RLC configuration, etc.). A limited number of QCIs have been standardized so that vendors can all have the same understanding of the underlying service characteristics and thus provide the corresponding forwarding treatment.

As mentioned above the S5 interlace can be based either on GTP or on PMIPv6 protocol. For a GTP-based S5 interface, the EPS bearer consists of a concatenation of S5 bearer (PG-WSGW), S1 bearer (SGWeNode B)—strictly speaking, a S1-U bearer for the user plane traffic—and a radio bearer (eNode BUE). An S5 bearer transports the packets of an EPS bearer between a PGW and a SGW. The SGW stores a one-to-one mapping between an S1 bearer and an S5 bearer. The bearer is identified in the corresponding gateway by the GTP tunnel endpoint ID (TEM) across both interfaces, i.e. the SGW identifies the S1 bearer by the GTP-TEID (also: S1-TEID) used for the S1 interface and the SGW identifies the S5 bearer by the GTP-TEID (also: S5-TEID) used for the S5 interface. An S1 bearer transports the packets of an EPS bearer between the SGW and an eNode B. A radio bearer transports the packets of an EPS bearer between a UE and an eNodeB.

For PMIP-based S5 interface, the EPS bearer is a concatenation of IP connectivity between PGW and SGW, one S1 bearer and one radio bearer. In other words, in case of a PMIP-based S5 interface being used, strictly speaking, there is no "S5 bearer", but IP connectivity between the PGW and the SGW is provided.

Reattachment of UE to a 3GPP Access Network

At handover from 3GPP access to non-3GPP access (e.g., untrusted non-3GPP access), all the UE's bearers (radio bearers, S1 bearers and S5 bearers) in the 3GPP access network are deleted and UE's mobility state is transferred to a DEREGISTERED state. Deleted means that the resources reserved for the EPS bearers are released (where applicable) and the bearers' context information are deleted in UE, eNode B, MME and SGW.

When the UE hands over from non-3GPP to the 3GPP access, the UE initiates handover attach procedure. When the UE is in the non-3GPP, usually the MME keeps the security context in the DEREGISTERED state. The security context contains the security related information of the UE obtained from the UE's Home Subscriber Server (HSS) or the AAA server. The availability of the security context in the MME avoids the repeated interaction between the MME and the HSS for the UE's authentication during the attach procedure. For example, in a handover attach procedure to 3GPP netowks, the MME first initiates the establishment of the S5 bearer between the SGW and the PGW. After this step is completed, the MME instructs the eNode B to start the establishment of the radio bearer and S1 bearer. The complete handover attach procedure takes a long time. In contrast, the handover from non-3GPP to 3GPP access may happen abrupt, because a non-3GPP access like WLAN has small cell coverage and the handover to the 3GPP access may not be predicted.

Figure 2:
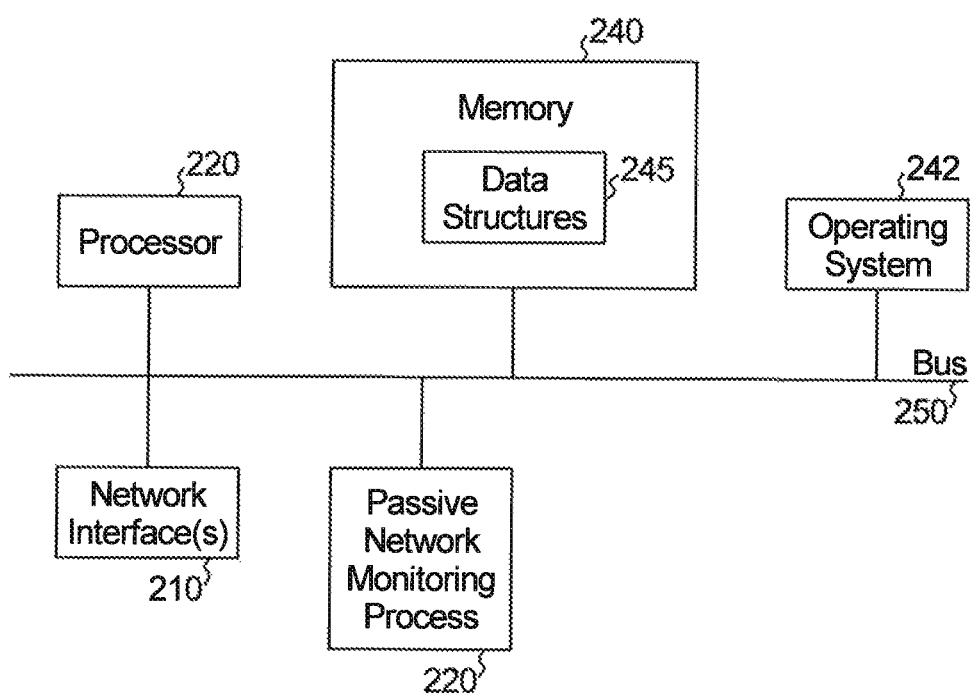
FIG. 2 illustrates an example network device/node.

FIG. 2 is a schematic block diagram of an example node/device 200 that may be used with one or more embodiments described herein, e.g., as any of the gateway devices, servers, network devices, etc., shown in communication network 100. Device 200 can also be used as a passive network monitoring device, as discussed with respect to FIG. 3 below. The device 200 may comprise one or more network interfaces 210, at least one processor 220 (e.g., a microcontroller), and a memory 240 interconnected by a system bus 250.

The network interface(s) 210 contain the mechanical, electrical, and signaling circuitry for communicating data over physical and/or wireless links coupled to the network 100. The network interfaces may be configured to transmit and/or receive data using a variety of different communication protocols, including, inter alia, TCP/IP, UDP, wireless protocols (e.g., IEEE Std. 802.15.4, WiFi, Bluetooth®), Ethernet, powerline communication (PLC) protocols, etc.

The memory 240 comprises a plurality of storage locations that are addressable by the processor 220 and the network interfaces 210 for storing software programs and data structures associated with the embodiments described herein. As noted above, certain devices may have limited memory or no memory (e.g., no memory for storage other than for programs/processes operating on the device). The processor 220 may comprise necessary elements or logic adapted to execute the software programs and manipulate data structures 245, such as routes or prefixes (notably on capable devices only). An operating system 242, portions of which are typically resident in memory 240 and executed by the processor, functionally organizes the device by, inter alia, invoking operations in support of software processes and/or services executing on the device. These software processes and/or services may comprise passive network monitoring process/services 244. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Passive network monitoring process (services) 244 contains computer executable instructions executed by the processor 220 to perform functions such as packet monitoring (e.g., packet sniffing, decoding packets, analyzing contents, subscriber mapping/correlation, etc.).

Illustratively, the techniques described herein may be performed by hardware, software, and/or firmware, such as in accordance with the routing process 244, which may contain computer executable instructions executed by the processor 220 (or independent processor of interfaces 210) to perform functions relating to the techniques described herein, e.g., in conjunction with passive network monitoring process 244.

As noted above, when subscriber UE transfers to/from 3GPP access from/to non-3GPP access (e.g., untrusted 3GPP access) subscriber information is typically lost. That is, tracking subscribers during UE transfers between networks is difficult at best, which affects accuracy when monitoring key performance indicators, Quality of Service (QoS), and other operating metrics for subscribers. Accordingly, this disclosure provides systems and methods that correlate handovers for subscribers between 3GPP networks and untrusted non-3GPP networks. In particular, the invention provides seamless tracking for subscribers' User Equipment (UE) across the various networks and correlates network connections established prior to a handover as well as post-handover.

Figure 3:
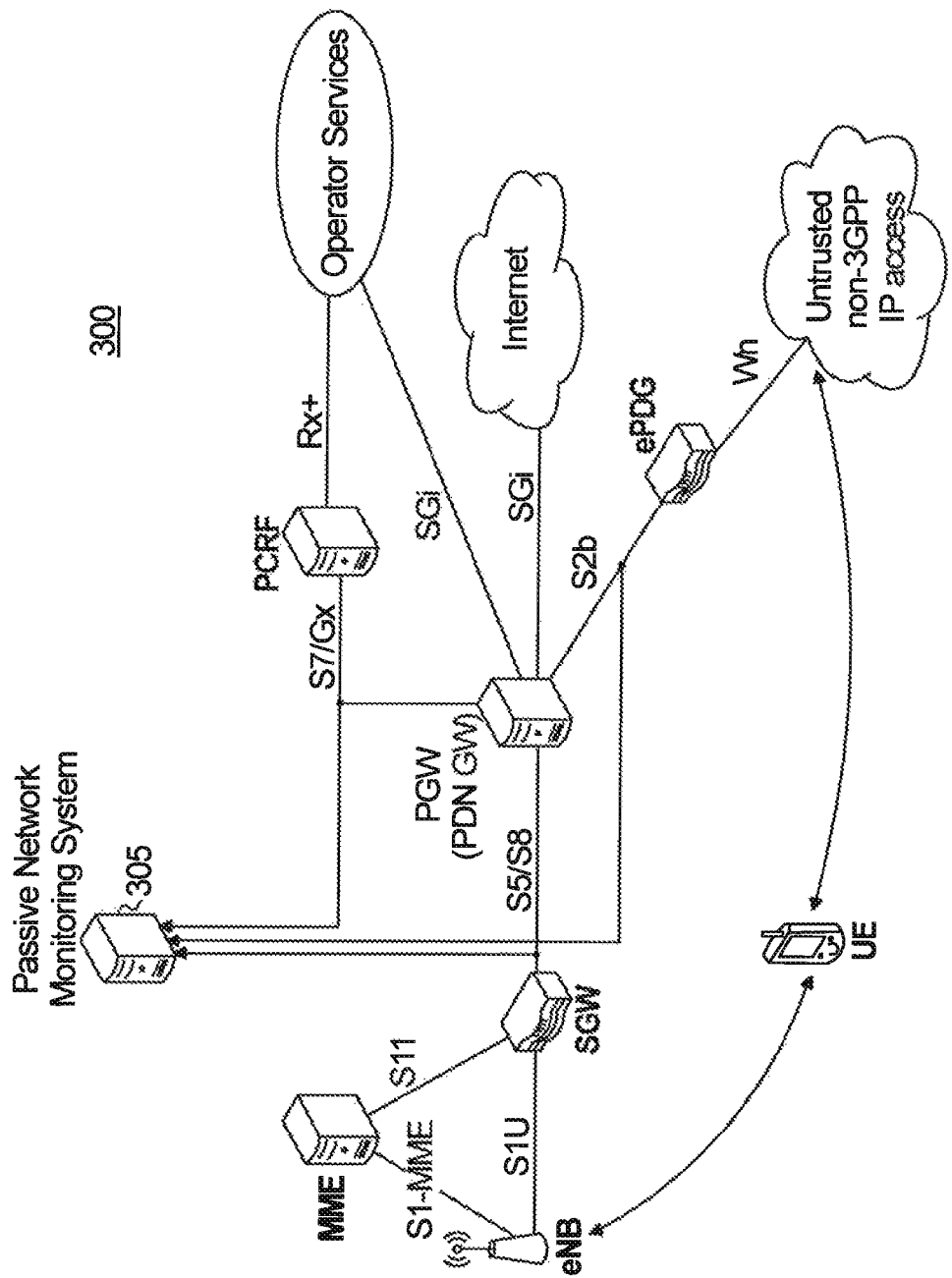
FIG. 3 illustrates an example view of a communication network showing transition of UE between 3GPP network access and untrusted non-3GPP network access.

FIG. 3 illustrates an example view of a communication network showing transition of UE between 3GPP network access and untrusted non-3GPP network access. In addition, FIG. 3 also provides a passive network monitoring system 305, which (as discussed above) can include one or more network nodes 200 (ref. FIG. 2).

As shown in FIG. 3, UE transitions between 3GPP access (e.g., via eNB) and untrusted 3GPP access (e.g., Internet Protocol (IP) based access, etc.). During UE transition, transition signaling (e.g., via attach requests, attach responses, etc.) is propagated amongst the various network nodes (e.g., SGW, PGW, PCRF, and ePDG, etc.), which is further discussed with respect to signaling diagrams shown in FIG. 4-5, below. Notably, passive network monitoring system 305 monitors communications lines including a S5/S8 network interface (e.g., between the SGW node and PGW node), a S7/Gx network interface (e.g., between the PCRF node and the PGW node), and a S2b network interface (e.g., between the ePDG node and the PGW node). Network monitoring system 305 is shown as a single system and may comprise one or more devices (i.e., network device 200 discussed above).

Figure 4:
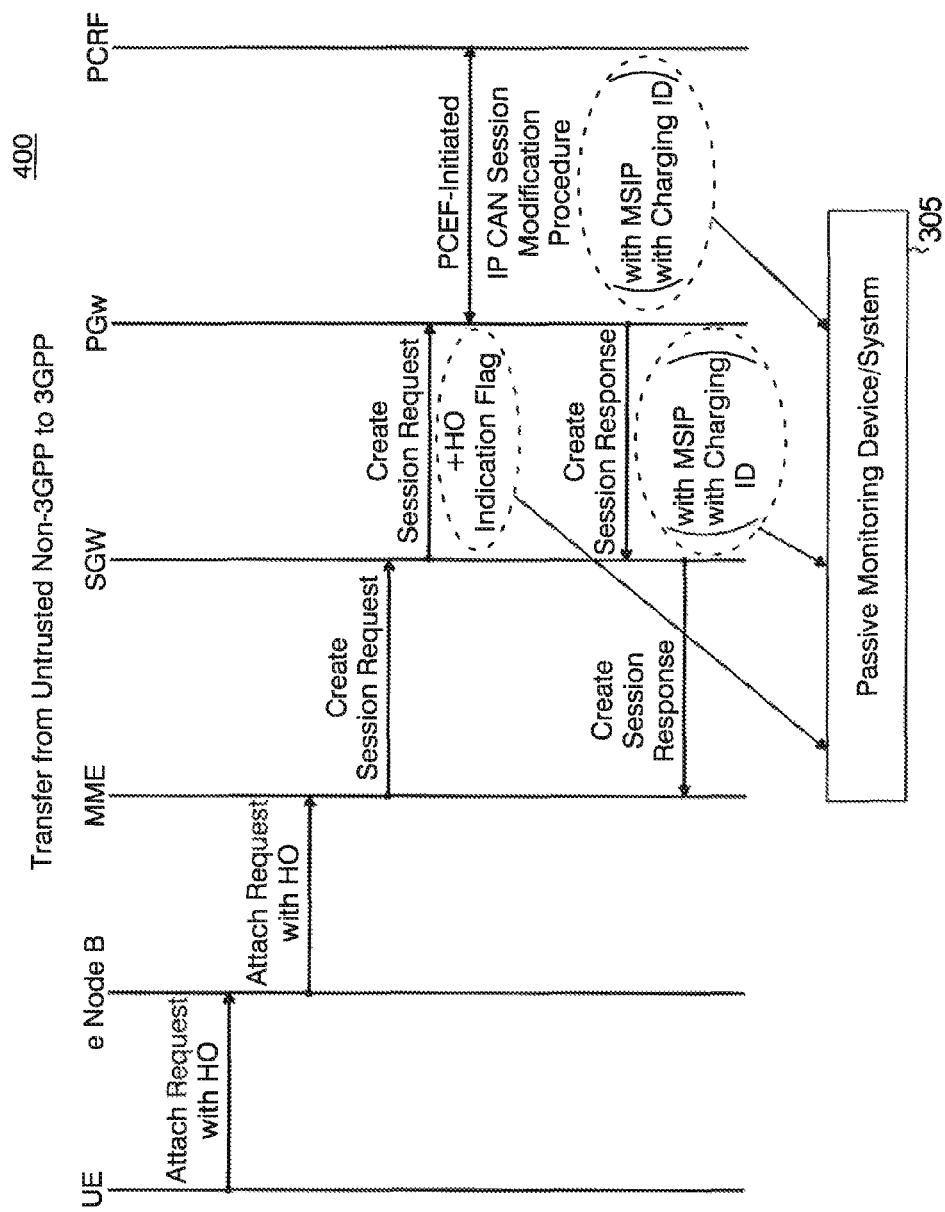
FIG. 4 illustrates an example signal diagram, showing communications between the various network nodes shown in FIG. 3, particularly from the perspective of UE transfer or transition from untrusted non-3GPP network access to 3GPP network access.

FIG. 4 illustrates an example signal diagram 400 showing communications between the various network nodes shown in FIG. 3, particularly from the perspective of UE transfer or transition from untrusted non-3GPP network access to 3GPP network access.

According to signaling diagram 400, the UE detects EUTRAN radio access (e.g., eNB) (e.g., via the LTE-Uu network interface) and determines to transfer its current sessions to EUTRAN. Next, the UE sends an "attach request" including a handover indication to the eNB via the S1U network interface. Additionally, the attach request also includes any one of the access point names (APNs) that it was previously connected to. Notably, the UE may be connected to several packet data networks (PDNs) during untrusted non-3GPP network access. The eNB propagates the attach request with handover indication to the MME node, which then sends a "create session request" to the SGW node.

In response the SGW node, sends the create session request with a handover indication flag set to true to the PGW node (e.g., via the S5 network interface). As shown, passive network monitoring system 305 receives the handover indication flag, which can be used to infer that the S5 network interface session is not a new allocation, but instead, refers to a handover from untrusted non-3GPP network access. Further, since the handover flag is set, the PGW node does not allocate any new MSIP addresses or default bearers to the PDN connection. Instead, the PGW node executes a PCEF-Initiated IP CAN Session Modification procedure with the PCRF node (e.g., via the Gx network interface). From this procedure, all active sessions the UE established in the untrusted non-3GPP network access are observed by the passive network monitoring system 305. For example, as shown, this includes any MSIP address (e.g., located in the PDN Address Allocation (PAA) field of the create session response) allocated for a particular APN. Next, the PGW node generates a create session response that contains a same charging identification (ID) previously assigned to the untrusted non-3GPP network access for the UE.

The passive network monitoring system 305 passively monitors communication (e.g., data packets) amongst the various network nodes and correlates the UE to a subscriber based on a combination of the handover flag from the create session request on the S5 network interface, the MSIP of the create session response on the S5 network interface, and the charging ID in the create session response(s) of the S5/S8, S2b and the Gx network interfaces. In this fashion, the passive network monitoring system 305 can maintain context information for the UE and further correlate the UE to a single subscriber across the network handover interfaces.

Figure 5:
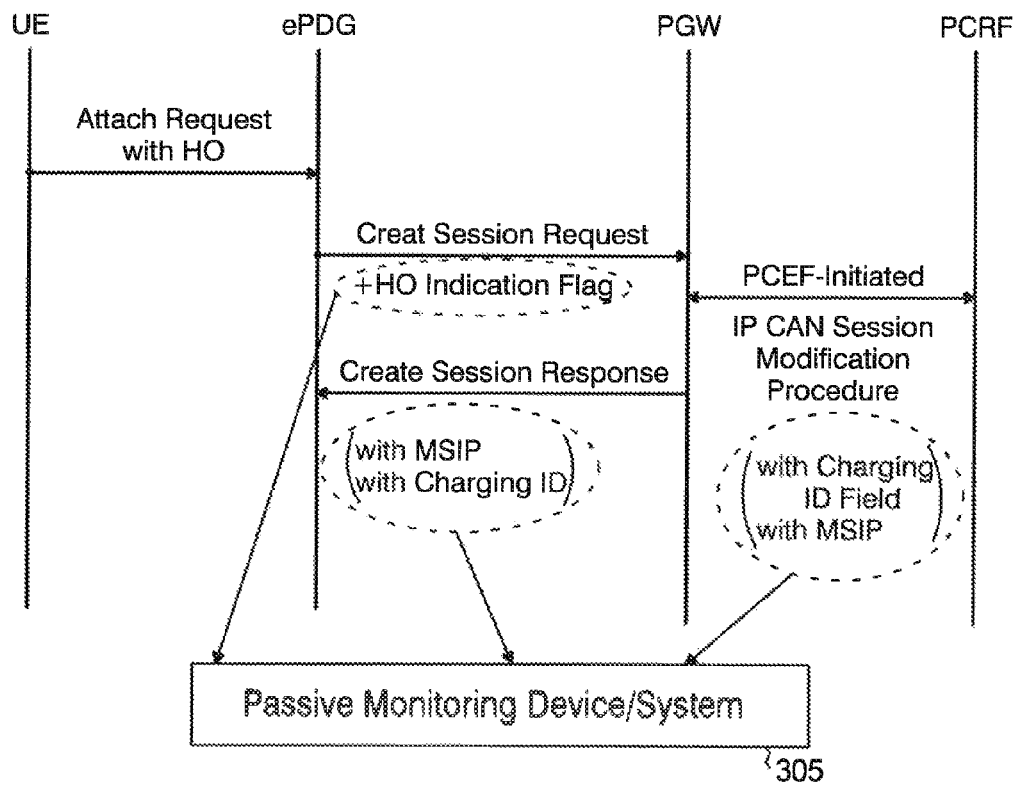
FIG. 5 illustrates an example signal diagram, showing communications between the various network nodes shown in FIG. 3, particularly from the perspective of UE transfer or transition from 3GPP network access to untrusted non-3GPP network access.

FIG. 5 illustrates an example signal diagram 500 showing communications between the various network nodes shown in FIG. 3, particularly from the perspective of UE transfer or transition from 3GPP network access to untrusted non-3GPP network access.

Similar to the transfer shown in FIG. 4, FIG. 5 shows UE transfer to non-3GPP network access (e.g., via the ePDG node). According to signal diagram 500, the UE sends an attach request with a handover indication to the ePDG node (e.g., via the Wn interface). Such handover indication can indicate a preserve session flag thereby maintaining a same MSIP previously assigned for 3GPP access. The ePDG node, similar to the SGW node of FIG. 4, receives the attach request and sends a create session request with the handover indication flag with or without the preserve session flag to the PGW node (e.g., via the S2b network interface). Here, the PGW node does not allocate any new MSIP address or default bearers since the handover indication included the preserve session flag from the UE. The PGW node resolves this handover via the PCEF-Initiated IP CAN session modification procedure, as discussed above. From the PCEF-Initiated IP CAN Session, all active sessions the UE established for 3GPP access are observed by the passive network monitoring system 305. As shown, this includes any MSIP address (e.g., located in the PDN Address Allocation (PAA) field of the create session response) allocated for a particular APN. Next, the PGW node generates a create session response that contains a same charging identification (ID) previously assigned to the untrusted non-3GPP network access for the UE. That is, since the preserve session flag was provided in the handover indication in the attach request, the PGW includes the same MSIP address previously allocated to the UE and additionally, the same charging ID previously assigned to the default bearer of the PDN connection as in 3GPP access. However, if the UE does not indicate a preserve session flag, the PGW node proceeds with a new session allocation.

Passive network monitoring system 305 passively monitors the communication (e.g., data packets) for transitions from 3GPP network access to untrusted non-3GPP network access correlates the UE to a subscriber based on a combination of the handover flag from the create session request on the S2b network interface, the MSIP of the create session response on the S2b network interface, and the charging ID in the create session response(s) of the S2b and the Gx network interfaces. In this fashion, the passive network monitoring system 305 can maintain context information for the UE and further correlate the UE to a single subscriber across the network handover interfaces.

Figure 6:
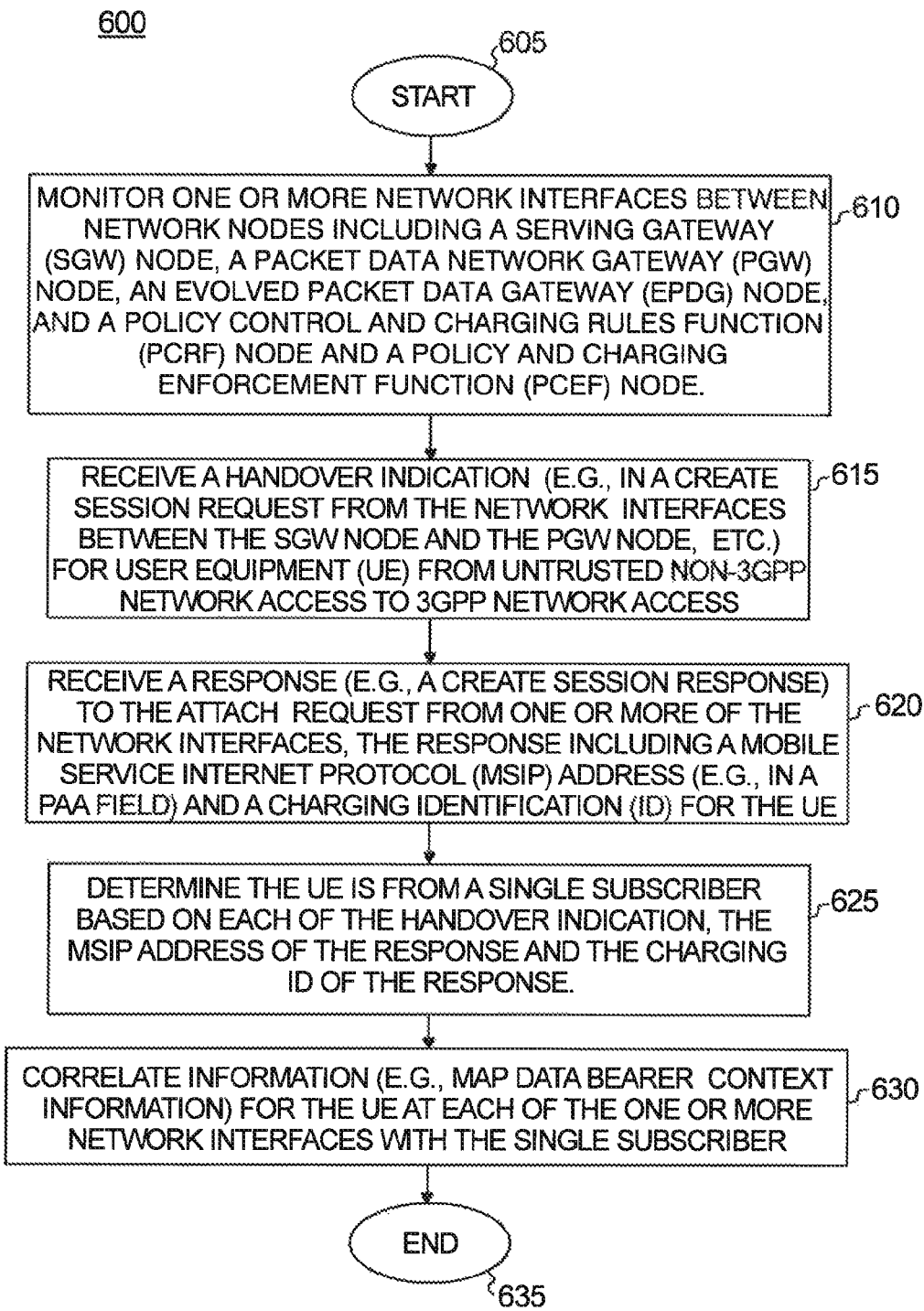
FIG. 6 illustrates an example simplified procedure for correlating a handover for UE from untrusted non-3GPP network access to 3GPP network access.
Figure 7:
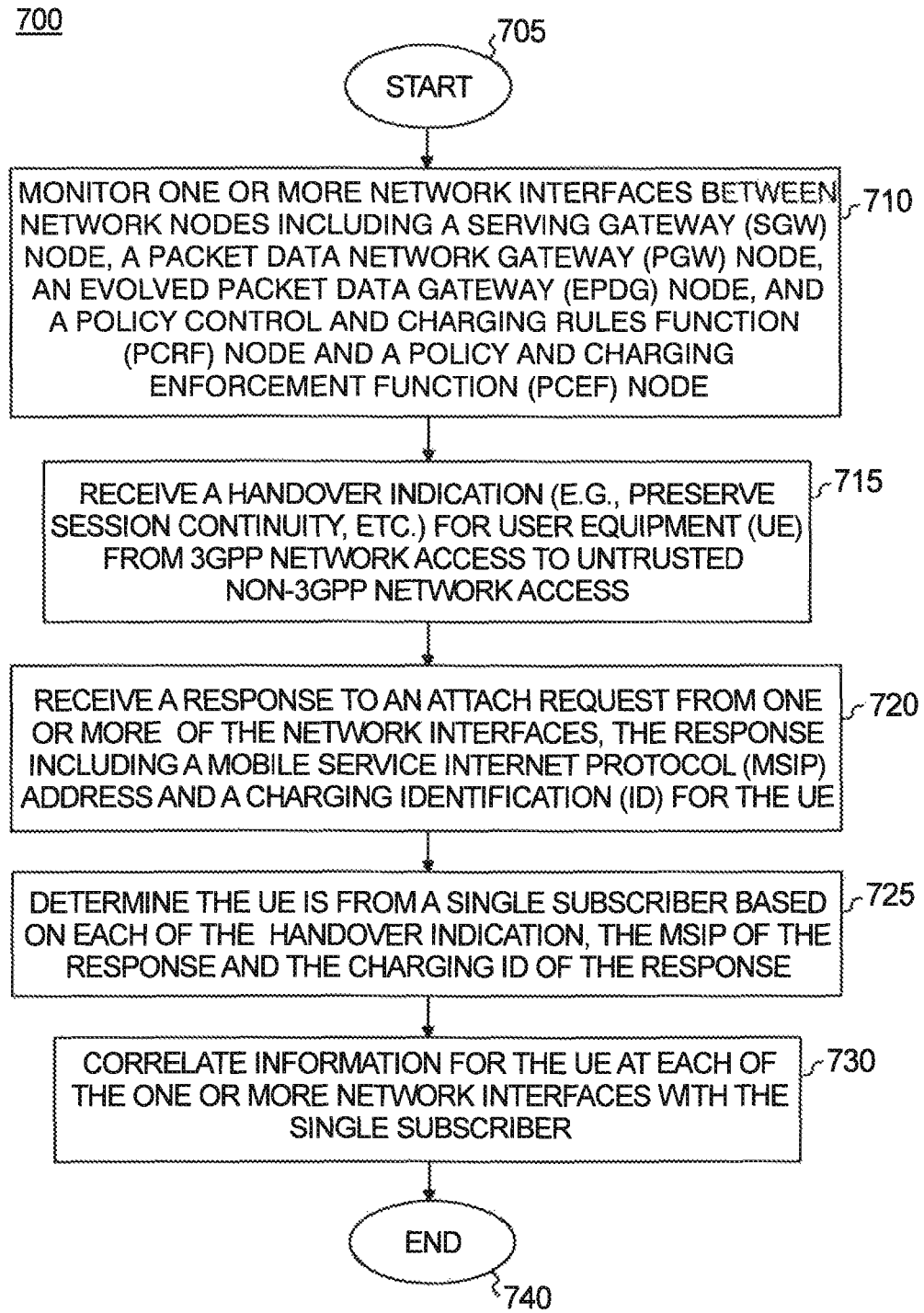
FIG. 7 illustrates an example simplified procedure for correlating a handover for UE from 3GPP network access to untrusted non-3GPP network access.

FIGS. 6-7 collectively illustrate simplified procedures 600 and 700, respectively, for correlating UE handovers between 3GPP network access and untrusted non-3GPP network access, in accordance with one or more embodiments described herein. In particular, the procedure 600 of FIG. 6 illustrates correlating a handover for UE from untrusted non-3GPP network access to 3GPP network access.

The procedure 600 starts at step 605, and continues to step 610, where, as described in greater detail above, a passive network monitoring device (i.e., passive network monitoring system 305) monitors one or more network interfaces between network nodes. For example, the passive network monitoring device monitors the network interfaces between a serving gateway (SGW) node, an evolved packet data gateway (ePDG) node, a policy and charging enforcement function (PCEF) node, etc. Next, in step 615, the passive network monitoring device receives a handover indication (e.g., via an attach request, via network interfaces between the SGW node and the PGW node, etc.) for User Equipment (UE) transitioning from untrusted non-3GPP network access to 3GPP network access. As discussed in greater detail above, in step 620, the passive network monitoring device then receives a response (e.g., a create session response) to the attach request from one or more of the network interfaces. The response includes a mobile service internet protocol (MSIP) address, which is typically in the PAA field and a charging identification (ID) for the UE. Based on each of the handover indication, the MSIP address of the response and the charging ID, the passive network monitoring device, in step 625 determines the UE is from a single subscriber and, in step 630, further correlates information (e.g., mapping data bearer context information) for the UE at each of the one or more network interfaces with the single subscriber. Procedure 600 may subsequently end in step 635, or can continue to step 610, where the passive network monitoring device monitors one or more network interfaces, discussed above.

Procedure 700, shown in FIG. 7, particularly illustrates correlating a handover for UE from 3GPP network access to untrusted non-3GPP network access. Procedure 700 starts at step 705 and continues to step 710 where, like step 610 in procedure 600, the passive network monitoring node monitors one or more network interfaces between network nodes that include a serving gateway (SGW) node, a packet data network (PGW) node, an evolved packet data gateway (ePDG) node. Next, the passive network monitoring device receives, in step 715 a handover indication (e.g., a preserve session continuity, etc.) for the UE transitioning from 3GPP network access to untrusted non-3GPP network access. Next, in step 720, the passive network monitoring device receives a response to an attach request from one or more of the network interfaces. The attach request includes a mobile service internet protocol (MSIP) and a charging ID for the UE. Based on the handover indication, the MSIP of the response as well as the charging ID of the response, the passive network monitoring device determines the UE is from a single subscriber in step 725. After the passive network monitoring device determines the UE is from a single subscriber, the passive network monitoring device correlates information (data bearers, context information, etc.) for the UE at each of the network interfaces with the single subscriber. Subsequently, procedure 700 may end in step 740, or may continue to step 710 where the passive network monitoring device monitors one or more network interfaces, discussed above.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, provide for correlating subscribers to User Equipment during handover between 3GPP network access and untrusted non-3GPP network access. In particular, the techniques herein map packet data network connections, default bearers, context information, etc., for User Equipment during handovers between different types of network access. Such information is useful, for example, when determining key performance indicators (KPIs). Moreover, using these techniques subscribers can be seamlessly tracked across network access technologies, which can provide additional metrics to measure quality of service (QoS) and other network performance criteria.

While there have been shown and described illustrative embodiments that provide for correlating subscribers to User Equipment with respect to specific network interfaces, it is to be understood that various other adaptations and modifications may be made within the spirit and scope of the embodiments herein. For example, the embodiments shown and described herein can readily be adapted for correlating subscribers for UE using Proxy Mobile Internet Protocol (PMIP) v6 (e.g., on S2B network interfaces), and the like.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   monitoring, via a passive network monitoring device, one or more network interfaces between network nodes including a serving gateway (SGW) node, a packet data network gateway (PGW) node, an evolved Packet Data Gateway (ePDG) node, and a Policy Control and Charging Rules Function (PCRF) node and a Policy and Charging Enforcement Function (PCEF) node;
   receiving, via the passive network monitoring device, a handover indication for User Equipment (UE) from untrusted non-3GPP network access to 3GPP network access;
   receiving, via the passive network monitoring device, a response to an attach request from one or more of the network interfaces, the response including a mobile service internet protocol (MSIP) address and a charging identification (ID) for the UE;
   determining, via the passive network monitoring device, the UE is from a single subscriber based on each of the handover indication, the MSIP address of the response and the charging ID of the response; and
   correlating information for the UE at each of the one or more network interfaces with the single subscriber.

2. The method of claim 1, further comprising:
   determining, via the passive network monitoring device, data bearer context information for the UE prior to receiving the attach request;
   determining, via the passive network monitoring device, data bearer context information for the UE after receiving the response; and mapping the data bearer context information determined prior to receiving the attach request to the data bearer context information determined after receiving the response, when the UE is from the single subscriber.

3. The method of claim 1, wherein receiving, via a passive network monitoring device, a handover indication for the UE further comprises:
receiving a create session request from the network interfaces between the SGW node and the PGW node, the create session request indicating the handover for the UE.

4. The method of claim 1, wherein the response is a create session response, wherein the MSIP address is indicated in a PDN Address Allocation (PAA) field of the response.

5. The method of claim 1, wherein the handover indication for UE from untrusted non-3GPP network access to 3GPP network access is indicated by the received attach request.

6. A method, comprising:
monitoring, via a passive network monitoring device, one or more network interfaces between network nodes including a serving gateway (SGW) node, a packet data network gateway (PGW) node, an evolved Packet Data Gateway (ePDG) node, and a Policy Control and Charging Rules Function (PCRF) node and a Policy and Charging Enforcement Function (PCEF) node;
receiving, via a passive network monitoring device, a handover indication for User Equipment (UE) from 3GPP network access to untrusted non-3GPP network access;
receiving, via the passive network monitoring device, a response to an attach request from one or more of the network interfaces, the response including a mobile service internet protocol (MSIP) address and a charging identification (ID) for the UE;
determining, via the passive network monitoring device, the UE is from a single subscriber based on each of the handover indication, the MSIP of the response and the charging ID of the response; and
correlating information for the UE at each of the one or more network interfaces with the single subscriber.

7. The method of claim 6, wherein the handover indication for the UE from 3GPP network access to untrusted non-3GPP network access indicates preservation of session continuity.

8. The method of claim 6, wherein the UE is previously allocated to an MSIP address prior to transmitting a handover.

9. The method of claim 6, wherein the handover indication for UE from 3GPP network access to untrusted non-3GPP network access is indicated by the received attach request.

10. The method of claim 9, further comprising:
determining, via the passive network monitoring device, data bearer context information for the UE prior to receiving the attach request;
determining, via the passive network monitoring device, data bearer context information for the UE after receiving the response; and
mapping the data bearer context information determined prior to receiving the attach request to the data bearer context information determined after receiving the response, when the UE is from the single subscriber.

11. An a passive network monitoring device, comprising:
one or more network interfaces configured to communicate in a communication network;
a processor configured to execute one or more processes; and
a memory configured to store a process executable by the processor, the process when executed configured to:
monitor one or more network interfaces between network nodes including a serving gateway (SGW) node, a packet data network gateway (PGW) node, an evolved Packet Data Gateway (ePDG) node, and a Policy Control and Charging Rules Function (PCRF) node and a Policy and Charging Enforcement Function (PCEF) node;
receive a handover indication for User Equipment (UE) from untrusted non-3GPP network access to 3GPP network access;
receive a response to an attach request from one or more of the network interfaces, the response including a mobile service internet protocol (MSIP) address and a charging identification (ID) for the UE;
determine the UE is from a single subscriber based on each of the handover indication, the MSIP of the response and the charging ID of the response; and
correlate information for the UE at each of the one or more network interfaces with the single subscriber.

12. The passive network monitoring device of claim 11, further comprising:
determine data bearer contact information for the UE prior to receiving the attach request;
determine data bearer context information for the UE after receiving the response; and
map the data bearer context information prior to receiving the attach request to the data bearer context information after receiving the response when the UE is from the single subscriber.

13. The passive network monitoring device of claim 11, wherein the process to receive the handover indication for the user equipment, when executed, is further configured to:
receive a create session request from the network interfaces between the SGW node and the PGW node, the create session request indicating the handover for the UE.

14. The passive network monitoring device of claim 11, wherein the response is a create session response, wherein the MSIP address is indicated by a PDN Address Allocation (PAA) field of the response.

15. A tangible, non-transitory, computer-readable media having software encoded thereon, the software, when executed by a processor, configured to:
monitor, via a passive network monitoring device, one or more network interfaces between network nodes including a serving gateway (SGW) node, a packet data network gateway (PGW) node, an evolved Packet Data Gateway (ePDG) node, and a Policy Control and Charging Rules Function (PCRF) node and a Policy and Charging Enforcement Function (PCEF) node;
receive, via the passive network monitoring device, a handover indication for User Equipment (UE) from 3GPP network access to untrusted non-3GPP network access;
receiving, via the passive network monitoring device, a response to an attach request from one or more of the network interfaces, the response including a mobile service internet protocol (MSIP) address and a charging identification (ID) for the UE;
determining, via the passive network monitoring device, the UE is from a single subscriber based on the handover, the MSIP address of the response and the charging ID of the response; and
correlating information for the UE at each of the one or more network interfaces with the single subscriber.

16. The method of claim 15, further comprising:
determining, via the passive network monitoring device, data bearer context information for the UE prior to receiving the attach request;

determining, via the passive network monitoring device, data bearer context information for the UE after receiving the response; and mapping the data bearer context information determined prior to receiving the attach request to the data bearer context information determined after receiving the response, when the UE is from the single subscriber.

17. The method of claim 16, wherein receiving, via a passive network monitoring device, a handover indication for the UE further comprises:

receiving a create session request from the network interfaces between the SGW node and the PGW node, the create session request indicating the handover for the UE.

18. The method of claim 15, wherein the response is a create session response, wherein the MSIP address is indicated in a PDN Address Allocation (PAA) field of the response.

* * * * *